US012767406B2

(12) United States Patent
Braverman et al.

(10) Patent No.: US 12,767,406 B2
(45) Date of Patent: *Oct. 20, 2026

(54) TAMPER-EVIDENT COVER SHEET FOR MULTI-COMPARTMENT ARTICLE DISPENSING PACKAGE

(71) Applicant: Medi-Dose, Inc., Ivyland, PA (US)

(72) Inventors: Robert Braverman, Warrington, PA (US); Donald A. Lawson, Lansdale, PA (US)

(73) Assignee: Medi-Dose, Inc., Ivyland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/212,982

(22) Filed: May 20, 2025

(65) Prior Publication Data

US 2025/0276838 A1 Sep. 4, 2025

Related U.S. Application Data

(63) Continuation of application No. 18/760,340, filed on Jul. 1, 2024, now Pat. No. 12,312,141, which is a continuation of application No. 18/106,691, filed on Feb. 7, 2023, now Pat. No. 12,043,463.

(51) Int. Cl.

| | |
|---|---|
| ***B65D 75/32*** | (2006.01) |
| ***A61J 1/03*** | (2023.01) |
| ***B65D 75/52*** | (2006.01) |

(52) U.S. Cl.

CPC ............ *B65D 75/327* (2013.01); *A61J 1/035* (2013.01); *B65D 75/527* (2013.01); *B65D 2575/3245* (2013.01); *B65D 2575/3281* (2013.01)

(58) Field of Classification Search

CPC .... B65D 2575/3281; B65D 2575/3245; B65D 75/527; B65D 75/327; B65D 2215/04; B65D 2215/00

USPC .................................................. 206/528–540

See application file for complete search history.

(56) References Cited

U.S. PATENT DOCUMENTS

| | | | | |
|---|---|---|---|---|
| 3,780,856 A | | 12/1973 | Braverman | |
| 3,924,748 A | * | 12/1975 | Braverman | B65D 75/58 206/820 |
| 4,122,651 A | | 10/1978 | Braverman | |
| 4,211,329 A | | 7/1980 | Braverman | |
| 4,316,541 A | | 2/1982 | Braverman et al. | |
| 4,322,930 A | | 4/1982 | Braverman | |
| 4,416,375 A | | 11/1983 | Braverman et al. | |
| 4,673,086 A | | 6/1987 | Braverman et al. | |

(Continued)

*Primary Examiner* — Chun Hoi Cheung

(74) *Attorney, Agent, or Firm* — Caesar Rivise, PC

(57) ABSTRACT

A cover sheet for a multi-compartment package for dispensing plural items is disclosed. The package includes plural individual sealed compartment units which are releasably secured to each other. Each compartment unit includes a flanged base from which a chamber depends. The chamber holds an item to be dispensed and is surrounded by a flange. The cover sheet, includes respective closure members releasably secured to each other by frangible lines. Each closure member is configured to be adhesively secured to the flange of each compartment unit. Each closure member includes plural arcuate tamper-evident cuts therein located adjacent respective corners of the closure member to initiate a tear upon attempted removal of the closure member from the flange of its associated compartment unit.

12 Claims, 6 Drawing Sheets

(56) References Cited

U.S. PATENT DOCUMENTS

| | | | | |
|---|---|---|---|---|
| 4,946,038 | A * | 8/1990 | Eaton | B65D 77/206 229/123.1 |
| 5,046,618 | A | 9/1991 | Wood | |
| 5,775,505 | A | 7/1998 | Vasquez et al. | |
| 5,799,426 | A | 9/1998 | Peterson | |
| 6,155,423 | A | 12/2000 | Katzner et al. | |
| 6,161,699 | A | 12/2000 | Gartland | |
| 6,230,894 | B1 | 5/2001 | Danville | |
| 6,352,158 | B1 | 3/2002 | Cole-Bennett et al. | |
| 6,830,153 | B2 | 12/2004 | French et al. | |
| 6,974,032 | B2 | 12/2005 | Intini | |
| 7,093,716 | B2 | 8/2006 | Intini | |
| 7,121,410 | B2 | 10/2006 | Rohrmus et al. | |
| 7,661,531 | B2 | 2/2010 | Intini | |
| 8,523,000 | B2 | 9/2013 | Vovan | |
| 8,740,003 | B2 | 6/2014 | Elliott | |
| 9,963,265 | B1 | 5/2018 | Braverman et al. | |
| 11,021,294 | B2 | 6/2021 | Hogan | |
| 11,358,771 | B2 | 6/2022 | Braverman et al. | |
| 2002/0166790 | A1 | 11/2002 | Aylward | |
| 2016/0257438 | A1 | 9/2016 | Van Landeghem et al. | |
| 2018/0153769 | A1 | 6/2018 | Dey et al. | |
| 2021/0229862 | A1 | 7/2021 | Braverman | |

* cited by examiner

TAMPER-EVIDENT COVER SHEET FOR MULTI-COMPARTMENT ARTICLE DISPENSING PACKAGE

CROSS-REFERENCE TO RELATED APPLICATIONS

This application is a Continuation of and claims the benefit under 35 U.S.C. § 120 of U.S. application Ser. No. 18/760,340, filed on Jul. 1, 2024, entitled Tamper-Evident Cover Sheet For Multi-Compartment Article Dispensing Package, which in turn is a Continuation of and claims the benefit under 35 U.S.C. § 120 of U.S. application Ser. No. 18/106,691, filed on Feb. 7, 2023, entitled Tamper-Evident Cover Sheet For Multi-Compartment Article Dispensing Package, now U.S. Pat. No. 12,043,463 both of which applications are assigned to the same assignee as the subject invention and whose disclosures are specifically incorporated by reference herein.

FIELD OF THE INVENTION

This invention relates generally to multi-compartment packages for dispensing items therefrom and more particularly to multi-compartment packages for dispensing items having tamper-evident closures.

BACKGROUND OF THE INVENTION

The patent literature includes various patents disclosing multi-compartment packages for dispensing medications. Such packages are typically made up of a blister base formed of some thin plastic material defining a plurality of compartments in which the medication is located, and a lid or label which is adhesively secured over blister base. The lid or label commonly is in the form of a lamination of a rupturable foil with a paper layer covering the foil. The paper layer is configured to be removable, e.g., peeled off of the foil, whereupon the medication can be dispensed by pressing on the bottom of the blister to cause the medication to rupture the foil and pass therethrough. The lid or label is configured to be tamper-evident, i.e., indicate if the lid or label had been tampered with to gain access to the medication in the associated compartment. Examples of patents relating to that type of package are: U.S. Pat. No. 5,046,618 (Wood); U.S. Pat. No. 6,974,032 (Intini); U.S. Pat. No. 7,093,716 (Intini); U.S. Pat. No. 7,661,531 (Intini); U.S. Pat. No. 8,523,000 (Vovan); and U.S. Pat. No. 8,740,003 (Elliott).

In U.S. Pat. No. 3,780,856 (Braverman) there is disclosed a medicinal dispensing device which is in the form of a multi-compartment base and a lid or cover adhesively secured to the base to enclose medications in the various compartments. Each of the compartments is configured to be separated from the other compartments to provide an individual dispensing unit (sometimes referred to as a unit-dose package), with the lid of each unit being configured to be peeled off of the base of the unit to provide access to the medication, without requiring the medication to be pushed through the lid. In particular, the base of the package of that patent is in the form of a plurality of flanges having corners and which are detachably connected to each other along predefined frangible lines so that each flange may be separated from the remaining flanges to form an individual dispensing unit. Each dispensing unit includes a chamber with an outer opening depending from the flange of the unit. The chamber is adapted to hold a drug, tablet, capsule, etc., in it. A continuous closure member is provided covering the chamber openings, with selected portions of the interior surface of the closure member being in contact with the flanges. The closure member is perforated along selected lines corresponding to the frangible flange lines of the base member. Portions of the interior surface of the closure member corresponding to the flanges are provided with a tacky adhesive coating which is in contact with the flanges to releasably secure the closure member onto the base member, such that each chamber and its surrounding flange is covered by a respective portion of the cover member to form a sealed compartment. Other areas of the interior surface of the closure member are non-tacky, e.g., include a liner patch, and cover the chamber openings. The sealed compartments are configured to be separated from each other along their frangible flange lines to produce separate sealed compartment units. At least one corner of each flange includes a cut-away area so that the existing corner of the closure member overlies the cut-away area to function as a lift tab to facilitate the removal, e.g., peeling, of the closure member from the flange of the sealed compartment unit to provide access to the contents of the chamber.

Other prior art medicinal dispensing devices, components thereof, and methods of manufacturing and assembling the same are found in the following United States Letters Patents: U.S. Pat. No. 4,122,651 (Braverman); U.S. Pat. No. 4,211,329 (Braverman); U.S. Pat. No. 4,316,541 (Braverman et al.); U.S. Pat. No. 4,322,930 (Braverman); U.S. Pat. No. 4,416,375 (Braverman et al.), U.S. Pat. No. 4,673,086 (Braverman et al.); and U.S. Pat. No. 9,963,265 (Braverman et al.).

While that prior art medicinal dispensing device of the aforementioned U.S. Pat. No. 3,780,856 is eminently suitable for its intended purposes it nevertheless leaves something to be desired from the standpoint of evidencing tampering. However, U.S. Pat. No. 11,358,771 (Braverman et al.) discloses a dispensing package like the package of U.S. Pat. No. 3,780,856, but with tamper-evidence features to indicate if the package had been tampered. Those tamper-evident features are in the form of a plurality tamper-evident cuts of a generally L-shape having a pair of legs which merge together at an apex, and with the apex directed toward and located closely adjacent a respective corner of the closure member. It has been determined that, depending upon variations in the manufacturing of the cover sheet of U.S. Pat. No. 11,358,771, the tamper-evident cuts may not perform as desired, thus requiring the rejection of any cover sheet whose tamper-evident cuts would not perform as desired. Thus, a need exists for a cover sheet with tamper-evident cuts which perform as desired irrespective of variations in the manufacture of the cover sheet. The subject invention addresses that need by providing a cover sheet having tamper evident features which constitute an improvement of the tamper evident features of the cover sheet of U.S. Pat. No. 11,358,771.

All references cited herein are incorporated herein by reference in their entireties.

SUMMARY OF THE INVENTION

Disclosed is a cover sheet for a dispensing package for holding an item therein. The package comprises a base member having a plurality of individual compartment units releasably secured to one another and disposed in an array of plural rows and plural columns. Each compartment unit comprises a flange and a chamber depending from the flange, with the flange extending around the periphery of the chamber and having plural corners. The flanges are detachably connected along frangible separation lines intersecting the corners so that each compartment unit may be separated from the other compartment units. The cover sheet comprises a top surface and an undersurface comprising a plurality of closure members disposed in an array of plural rows and plural columns. Each of the closure members includes plural corners. The closure members are releasably secured to one another along frangible separation lines intersecting the corners of the closure members. The undersurface of the cover sheet is configured to be releasably secured to the flanges of the base member, whereupon the frangible separation lines of the cover sheet are coincident with the frangible separation lines of the base member and respective ones of the closure members are releasably secured to respective ones of the compartment units to form respective sealed compartment units with an item disposed therein. Each of the closure members comprise a plurality of tamper-evident cuts extending into the top surface of the cover sheet. Each of the tamper-evident cuts is arcuate, having an apex at a midpoint thereof. The apex of each of the tamper-evident cuts of each closure member is directed toward and located closely adjacent a respective corner of the closure member and configured to initiate tearing of the closure member upon lifting of the closure member off an associated compartment unit at a corner located closely adjacent the tamper-evident cut.

In accordance with one preferred aspect of the cover sheet of this invention, each of the tamper-evident cuts of each of the closure members comprises a rounded corner of a square or rectangle centered in each of the closure members.

In accordance with another preferred aspect of the cover sheet of this invention, each of the tamper-evident cuts comprises an arc of a circle.

In accordance with another preferred aspect of the cover sheet of this invention, the undersurface has an adhesive thereon. The adhesive is configured to releasably secure the cover sheet to the base member.

In accordance with another preferred aspect of the cover sheet of this invention, the undersurface of each of the closure members includes a liner patch configured to be disposed over an opening of the chamber.

In accordance with another preferred aspect of the cover sheet of this invention, the cover sheet includes indicia thereon. The indicia is located at respective portions of the cover sheet corresponding to the location of the cut away or foldable tab corners of the compartment units when the cover sheet is secured thereto.

In accordance with another preferred aspect of the cover sheet of this invention, each of the closure members is of a square shape.

In accordance with another preferred aspect of the cover sheet of this invention, the upper surface is formed of paper, and the undersurface is a metal foil.

In accordance with another preferred aspect of the cover sheet of this invention, the tamper-evident cuts extend at least partially into the closure members from the top surface towards the undersurface.

In accordance with another preferred aspect of the cover sheet of this invention, the tamper evident cuts extend fully through the closure members from the top surface to the undersurface.

DETAILED DESCRIPTION OF THE PREFERRED EMBODIMENTS

Figure 1:
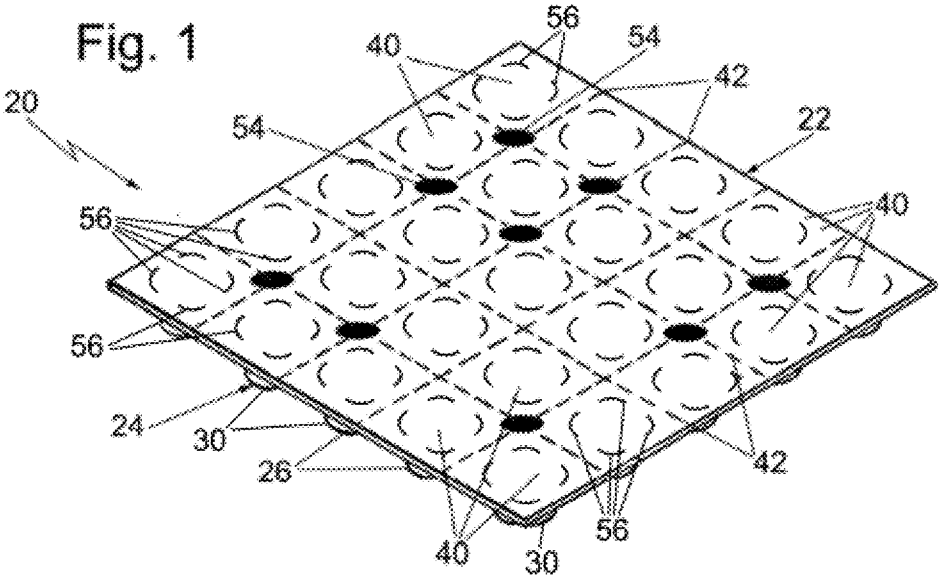
FIG. 1 is an isometric view of one exemplary embodiment of a tamper-evident multi-compartment dispensing package wherein the package includes a frangible multi-compartment base and a frangible cover sheet constructed in accordance with this invention, with the cover sheet made up of plural closure members each of which includes plural arcuate tamper-evident cuts.

Referring now to the various figures of the drawing wherein like reference characters refer to like parts, there is shown in FIG. 1 one exemplary embodiment of a multi-compartment dispensing package 20 constructed in accordance with this invention. The multi-compartment package basically comprises a cover sheet 22 and a base member 24.

Figure 2:
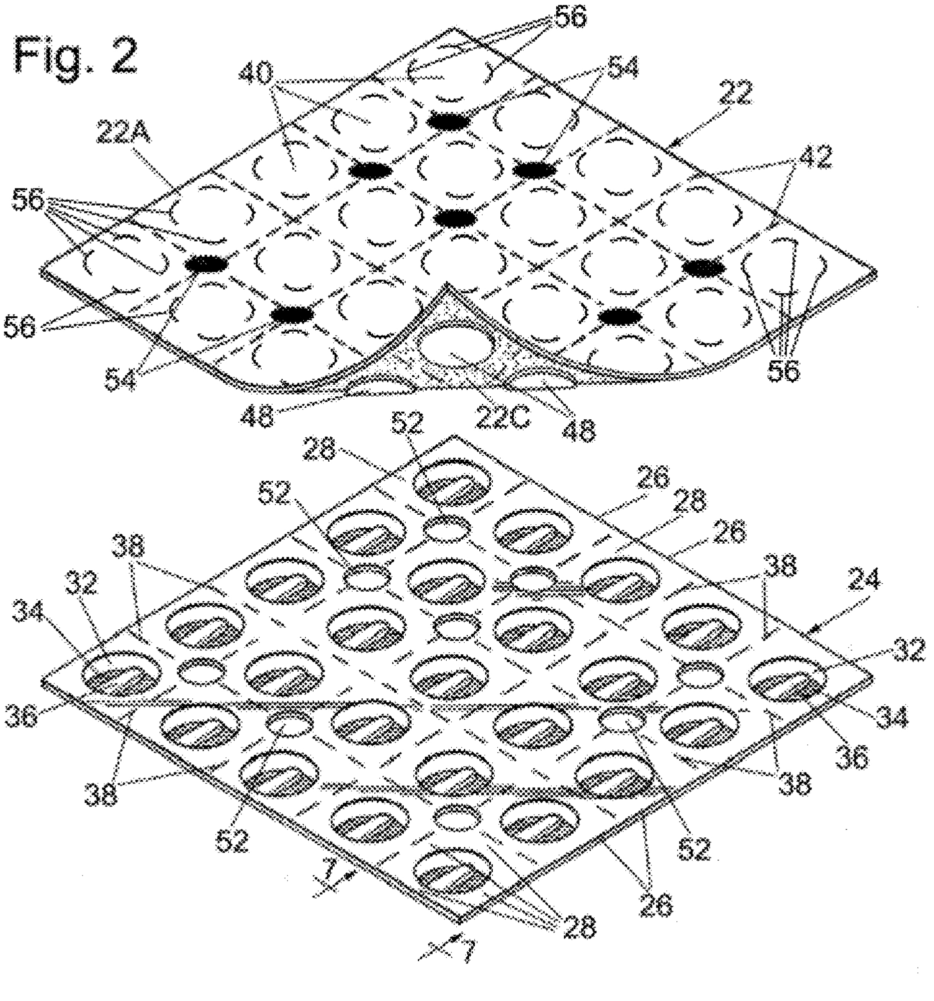
FIG. 2 is an isometric view of cover sheet of FIG. 1 in position about to be secured onto the multi-compartment base to seal the contents, e.g., medications, of the compartments making up the base within those compartments.
Figure 3:
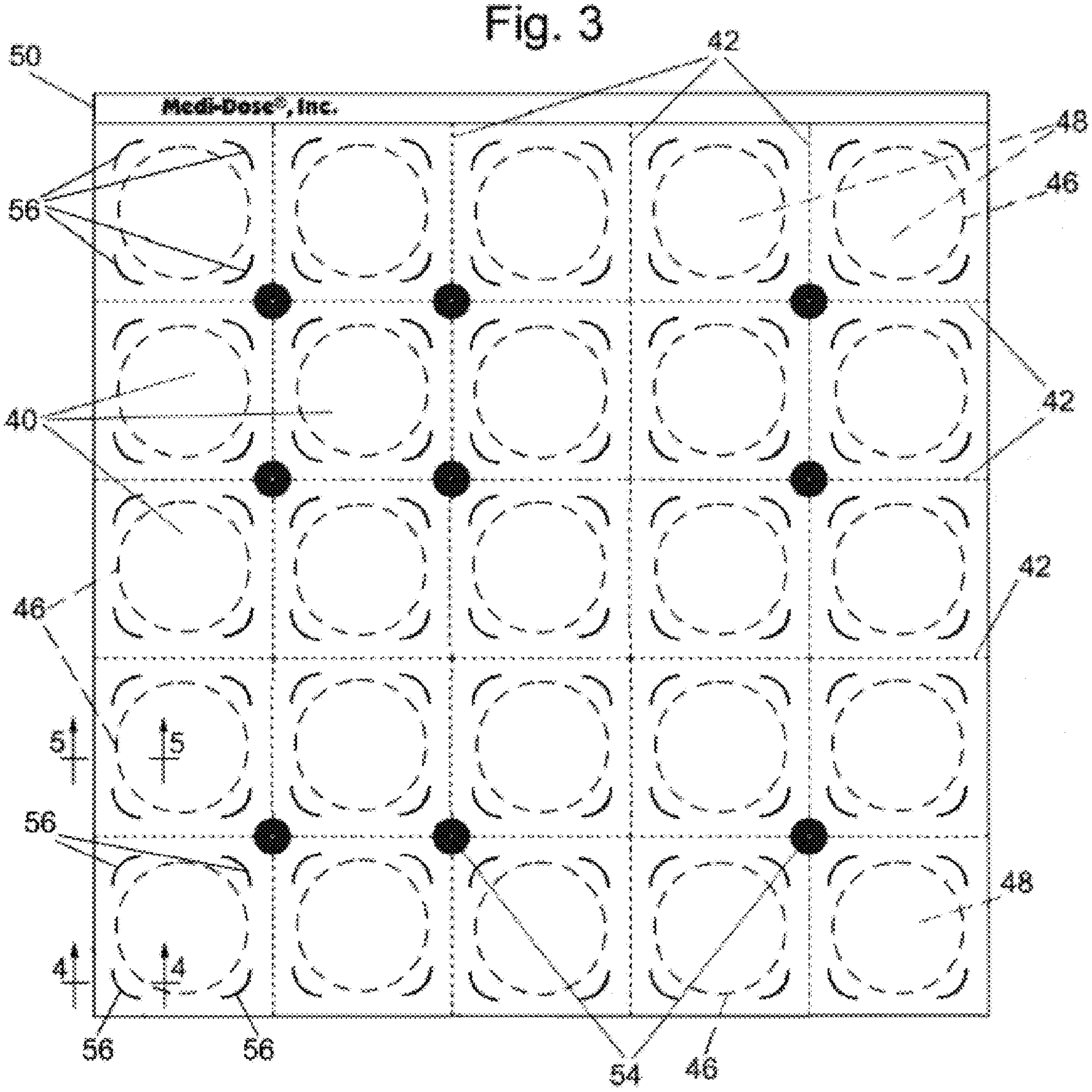
FIG. 3 is an enlarged top plan view of the frangible cover sheet shown in FIGS. 1 and 2.

The base member 24 is best seen in FIGS. 2, 3, 6 and 7 and includes plural "blister" compartment units 26, each of which is of square profile having a generally planar flange 28 from which a hollow chamber 30 depends downwardly. In this exemplary embodiment each compartment unit is approximately 3 cm by 3 cm square. As best seen in FIG. 3, each chamber 30 is of circular profile, e.g., of 2.2 cm diameter, and includes a downwardly extending tapering circular sidewall 32 (FIG. 7) which terminates at a generally planar bottom wall 34. The exemplary embodiment of the package 20 is configured for holding relatively one or more drugs, tablets, capsules, liquids, ointments, lotions, botanicals or any other items desired to be packaged for dispensing. The exemplary items shown held in the package are in the form of tablets 36. The flanges 28 of the compartment units 26 are releasably connected to one another by plural intersecting parallel linear frangible lines 38. In the preferred exemplary embodiment of the package 20 shown in FIG. 1, the package includes twenty-five compartment units 26 disposed in an array of five rows of five columns, with the frangible lines 38 establishing the rows and columns of the array. The compartments units are formed of any suitable material, e.g., a plastic, like that of the blister compartments of the prior art patents cited above.

Figure 6:
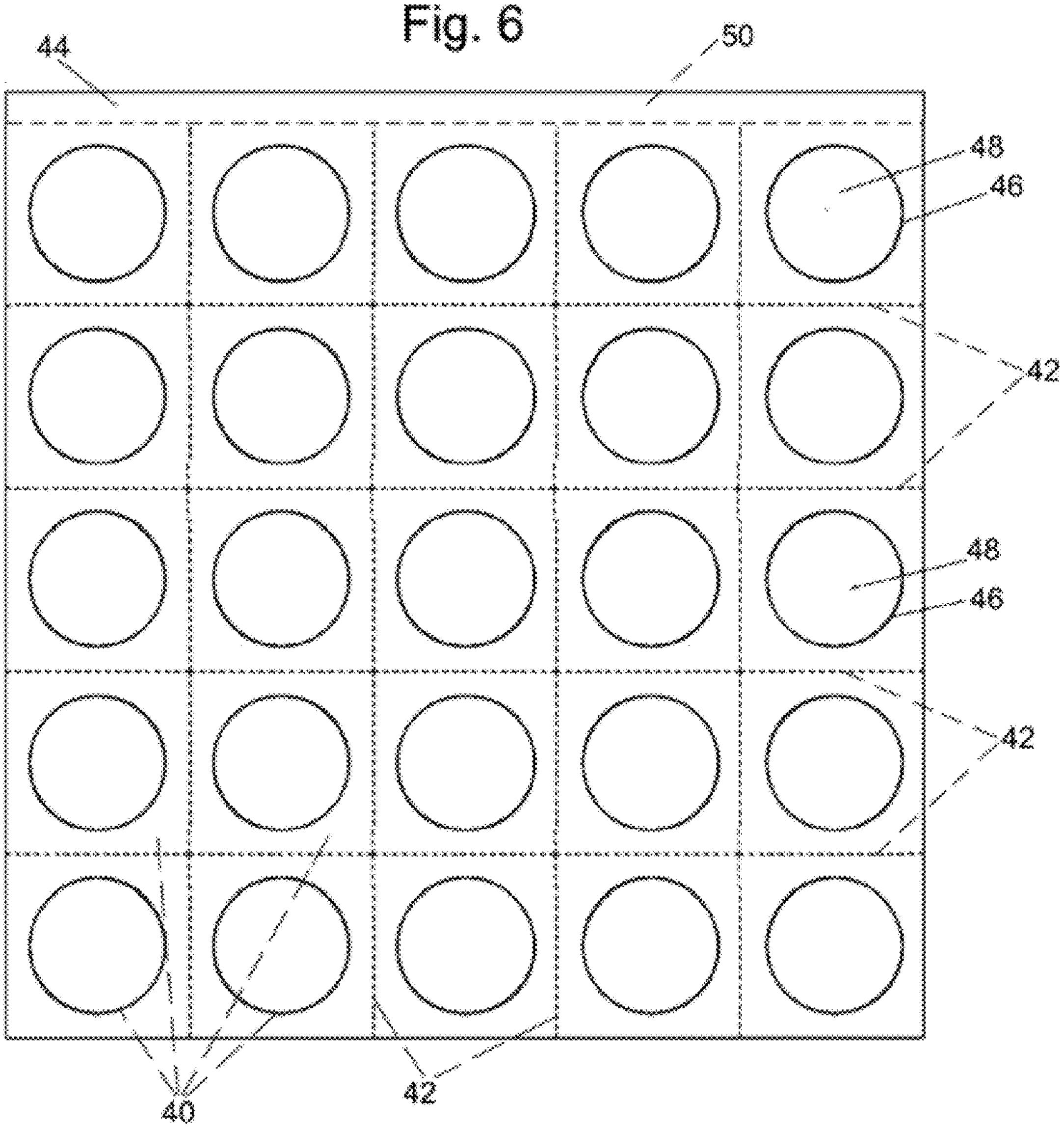
FIG. 6 is a bottom plan view of the frangible cover sheet shown in FIGS. 1-3.
Figure 7:
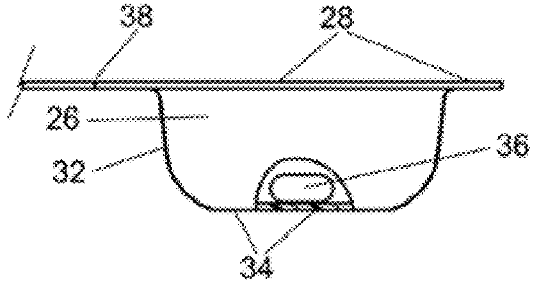
FIG. 7 is an enlarged side elevational view, partially broken away, taken along line 7-7 of FIG. 2 and showing a portion of the multi-compartment base.

Each of the compartment units 26 is configured to be covered and sealed by a respective correspondingly shaped and sized closure member 40. In particular, the closure members 40 form respective portions of the cover sheet 22. As can be seen in FIGS. 2, 3 and 6 the cover sheet 22 is a generally planar member of square profile that includes twenty-five closure members 40 disposed in an array of five rows and five columns. The array of closure members is established by plural parallel intersecting linear frangible line 42. The cover sheet is coextensive in size with the base member 24 and the frangible lines 42 of the cover sheet are coincident with the frangible lines 38 of the base member.

Figure 4:
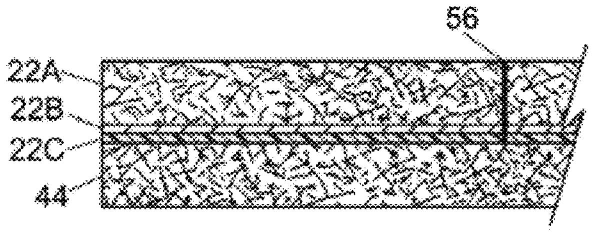
FIG. 4 is a greatly enlarged sectional view taken along line 4-4 of FIG. 3.
Figure 5:
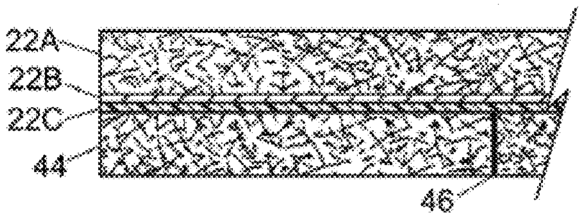
FIG. 5 is a greatly enlarged sectional view taken along line 5-5 of FIG. 3

In accordance with a preferred aspect of this invention and as best seen in FIG. 4, the cover sheet 22 is preferably formed as a multi-layer construction or lamination (to be described later). Suffice it for now to state that the cover sheet 22 has an outside layer 22A, which is composed of paper and which forms the top surface of the cover sheet, with a metal foil layer 22B disposed under the outside paper layer. The undersurface of the foil layer 22B includes a layer of a releasably securable adhesive 22C extending across the entire undersurface of the foil layer. The adhesive 22C serves to releasably secure each closure member to a respective one of the compartment units 26 when the cover sheet 22 is secured to the base member 24 (as will be described later). The outer surface (i.e., the undersurface) of the adhesive layer 22C is covered by a releasably securable liner sheet 44. The liner sheet includes a plurality of die-cut circles 46 in it, with each die cut circle being located centered within the bounds of a respective closure member 40. Each die cut circle forms a respective circular patch 48, each of which is arranged to be located over respective chamber 30 of the base when the cover sheet is secured thereto. To that end, after the chambers 30 in the base member have been filled with the items 36, like shown in FIG. 2, and just before the cover sheet is to be releasably secured to the base member, the liner sheet 44 is then removed, e.g., peeled off, of the undersurface of the foil layer 22B by grasping a marginal edge strip 50 (FIG. 3) of the cover sheet and pulling it away from the remaining portion of the liner sheet 44, thereby leaving the liner patches 48 in place on the cover sheet, with portions of the adhesive 22C not covered by the patches exposed. The cover sheet 22 can then be releasably secured to the base member by the exposed adhesive 22C of the cover sheet 22 engaging the flanges 28 of the compartment units 26 of the base member 24. This action seals the items in each of the compartment units 26, thereby completing the package 20 so that it is now in the form of plural sealed compartment units which are releasably secured to one another. Since each liner patch 48 is coincident in size to the opening of the chamber 30 over which it is disposed, no portion of the adhesive 22C will be exposed to the item 36 within the chamber 30.

Use of the package 20 to dispense the item 36 held within any of the sealed compartment units 26 is as follows. The particular sealed compartment may be separated from the remaining compartments of the base member by tearing or otherwise breaking the coincident frangible lines 42 and 38 which connect that unit to the remaining units. That action results in a separated sealed compartment unit. In order to provide access to the item within the chamber of that compartment unit the closure member 40 which is adhesively secured to the flange 28 of that compartment unit must be removed, e.g., lifted and peeled off, of the flange. In order to facilitate the lifting of the closure member off of the flange, each flange includes at least one corner that is cutaway to enable a user to gain access to the underside of the closure member 22 to serve as a lift tab peel the closure member up and away from flange to open the sealed compartment containing the item 36 to be accessed.

In accordance with one preferred aspect of this invention, if the package is in the form of a five-by-five array of compartment units 26, like in the exemplary embodiment 20 shown, at nine of the intersections of the frangible lines 38 of the base member 24 there are provided punched openings 52. The punched openings are in the form of circles, but could be of other shapes. In any case, the punched openings are arranged as set forth in the aforementioned U.S. Pat. No. 3,780,856 (Braverman). In particular, each punched opening 52 acts as a cutaway area for the four flanges meeting at the intersection of the frangible lines at which the opening is located. Those nine punched openings 52 thus provide at least one cut-away area for each of the twenty-five flanges of the base member to facilitate the removal, e.g., peeling off, of the closure member on the particular compartment holding the item to be accessed. With the openings arranged as shown the base member can include a minimum number, e.g., nine, of openings, yet one corner of each flange will be cutaway so that the corner of the closure member releasably secured to the flange is always free of the flange where the punched opening is located. In this way, a corner of each closure member 40 is always readily accessible for lifting in order to facilitate the separation of the closure member from the flange when a user desires to gain access to the item 36 held in the associated chamber.

As best seen in FIG. 2, in the exemplary embodiment of the package 20 the openings 52 are located at the intersection of the first (topmost) row and first (leftmost) column, at the intersection of the second row and first column, at the intersection of the fifth row and first column, at the intersection of the first row and the second column, at the intersection of the second row and the second column, at the intersection of the fifth row and the second column, at the intersection of the first row and the fifth column, at the intersection of the second row and the fifth column, and at the intersection of the fifth row and the fifth column.

The cover sheet 22 includes indicia, e.g., circular dots 54, located at nine intersections of the frangible lines 42, so that when the cover sheet is secured to the base member the dots overlie respective ones of the punched openings 52 of the base. Thus, when an individual sealed compartment is separated from the remainder of the compartments of the package 20, a quarter sector of a dot 54 will be located in the corner of the closure member of the separated sealed compartment overlying the cutaway portion of the unit to indicate to the user which corner of the closure member should be lifted to provide access to the item in the chamber.

In the interest of safety each of the closure members is tamper evident, so that if anyone attempted to tamper with the package, e.g., peel any portion of the cover sheet off of the base member after the compartments of the base member have been filled with items and the cover sheet secured to the flanges of the base member, such tampering would be readily evident. In particular, each closure member includes four tamper-evident cuts 56 arranged in a square array, with each cut being located closely adjacent a respective corner of the closure member.

Figure 8:
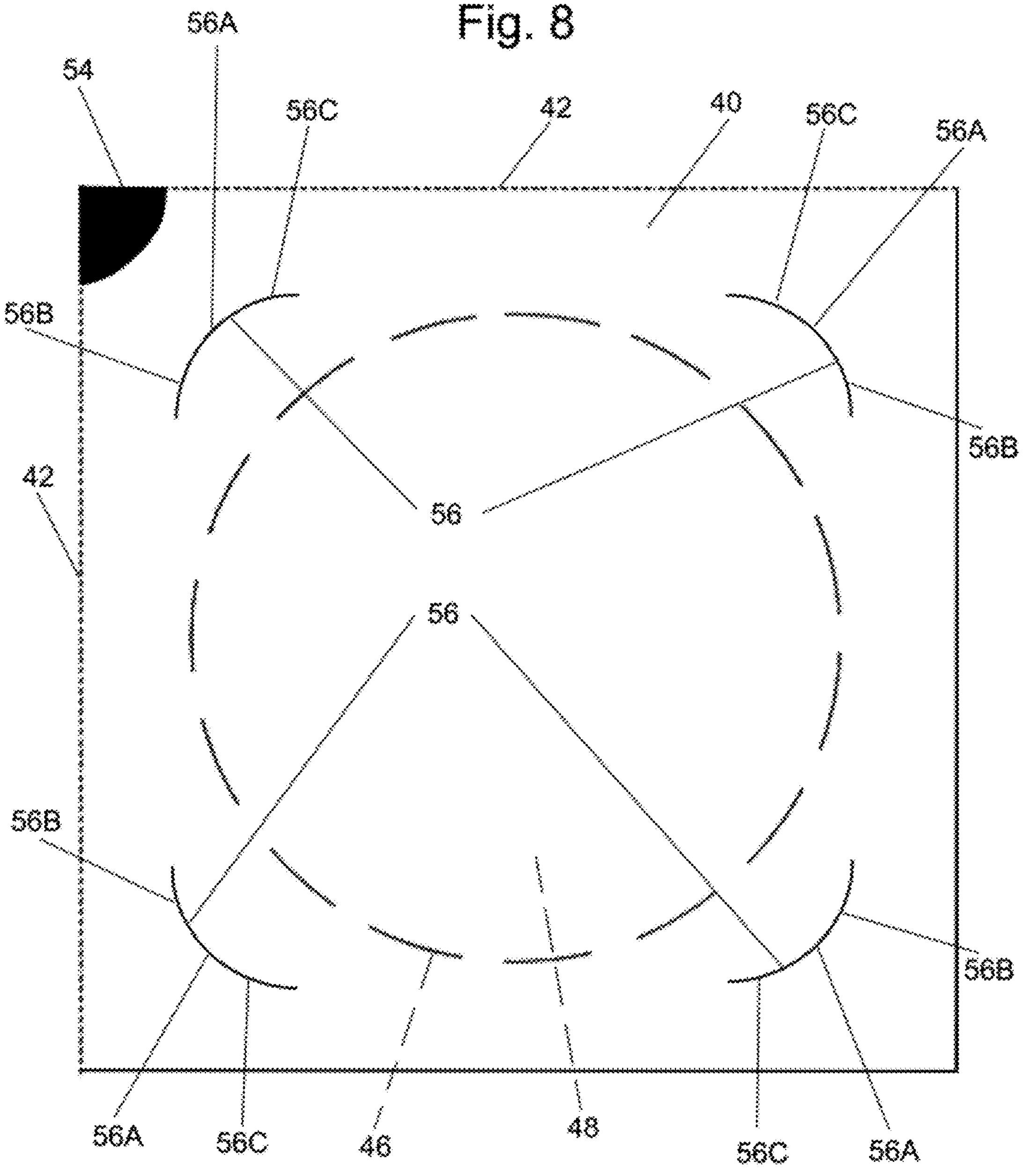
FIG. 8 is a greatly enlarged top plan view of one separated sealed compartment of the dispensing package of FIG. 1.

As best seen in FIG. 8, each tamper-evident cut is of an arched or arcuate shape, e.g., an arc of a circle, such that it includes an apex 56A located facing the adjacent corner of the closure member and leg portion or legs 56B and 56C located on opposite sides of the apex 56A. In accordance with one preferred aspect of this invention the arch-shaped tamper-evident cuts are symmetrical in shape, i.e., the length and shape of both legs 56B and 56C is identical. It is preferred, but not mandatory, that the tamper-evident cuts are each an arc of a circle having a constant or fixed radius of curvature.

Figure 8A:
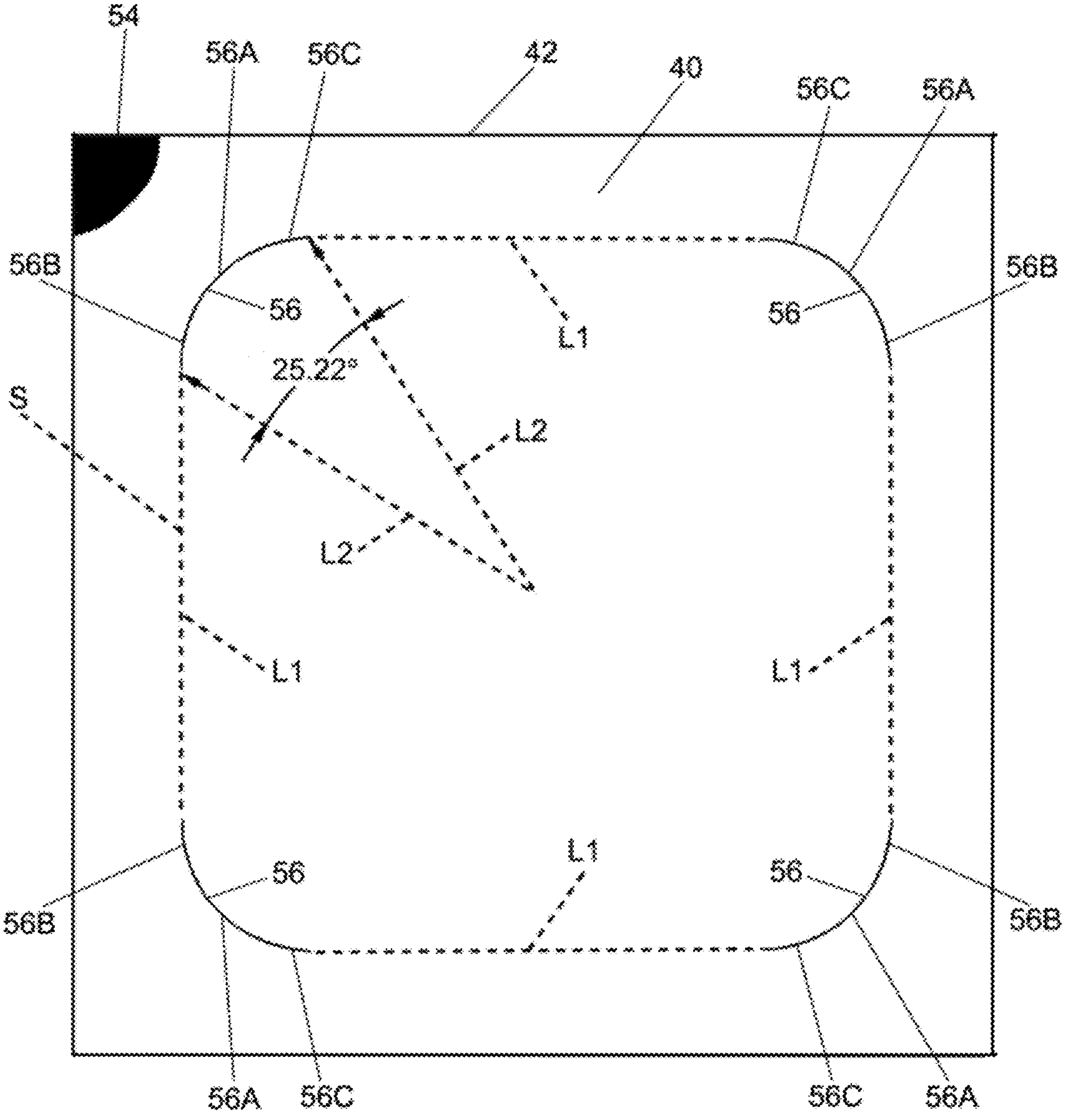
FIG. 8A is a plan view similar to FIG. 8, but showing more details about the tamper-evident cuts of the closure member sealing the one separated sealed compartment of FIG. 8.

In the exemplary embodiment each of the tamper-evident cuts 56 is a rounded corner of an imaginary square S centered in its particular closure member 40 as clearly shown in FIG. 8A. In particular, the imaginary square is shown by broken lines L1. As can clearly be seen in FIG. 8A, the included angle measured between broken lines L2 measured from the center of the square S to the ends of the leg portions 56B and 56C of each tamper-evident cut 56 is approximately 25.22 degrees, with the arc of each tamper-evident-cut being approximately 90 degrees. It is to be understood that the tamper-evident cuts 56 can be the rounded corners of a rectangle instead of a square. In fact, the tamper-evident cuts 56 may be of other sizes and shapes, so long as they form rounded corners of a square or rectangle which is centered in its particular closure member. To that end, the tamper-evident cut 56 need not be arcs of a circle, but can be other shaped arcs, e.g., arcs of an oval or some other curved shape, preferably with the arcs having an apex directed or facing toward the adjacent corner of the closure member.

Each of the tamper-evident cuts 56 is located so that when the closure member 40 is secured to respective compartment 26 of the base member 24, each cut is disposed over a respective portion of the underlying flange 28. Each of the tamper-evident 56 cuts extends at least partially through the lamination forming the cover sheet. In the exemplary embodiment shown in FIG. 4 each cut 56 extends fully through the layers 22A-22C of the cover sheet. In any case each cut provides a weakened area of the closure member at the location of the cut. Thus, if someone attempts to lift the closure member adjacent any corner the portion of the closure continuous with apex of the cut will attempt to remain secured to the flange, while the portions of the cut forming the legs 56B and 56C of the cut start a tear, which propagates therefrom to the adjacent portion of the closure member. That tear becomes readily visible, thereby indicating attempted or actual tampering with the package has occurred.

While it is preferred that each closure member includes a tamper-evident cut adjacent each of the corners of that closure member, that need not be the case for all applications. Thus, if desired only a single corner or selected corners of the closure members may include a tamper-evident closure member.

In accordance with one preferred exemplary embodiment of this invention the combination of the layers 22A and 22B (referred to as the "face-stock") is in the form of an inverted 0.000285 inch foil laminated to a 60 pound paper base sheet, with the basis weight of the face stock being 70 pounds per 500 sheet ream of 25 inch by 38 inch sheets. The thickness or caliper of the face-stock is 0.036 inch. The foil itself is aluminum and of a thickness or caliper of 0.000285 inch. The adhesive making up the layer 22C is an aggressive high tack permanent acrylic emulsion adhesive of 0.00085 inch thickness or caliper and having a loop tack of 4.6 pounds per square inch. The adhesive instantly adheres to many surfaces with a tamper evident bond. The release liner sheet 44 is high bulk to weight silicone coated MG bleached Kraft paper, having a thickness or caliper of 0.0032 inch.

The base member 22 can be constructed of any suitable commercially available plastic material that exhibits good moisture resistance. Examples of some suitable materials are pharmaceutical grade thermoformable rigid PVC plastic films, like Pentapharm® PH-M57/04 film sold by Klöckner Pentaplast of America, Inc. or Pentapharm® alfoil Polymer film P-250/40 also sold by Klöckner Pentaplast of America, Inc. or thermoformable rigid PVC films like Perlalux® Mono sold by Perlen Converting AG of Perlen Switzerland or Perlalux®-Duplex 500.40 (C) UV also sold by Perlen Converting AG. Other plastic materials can be used as well, depending upon the items/products to be held within the compartments of the base member.

Figure 9:
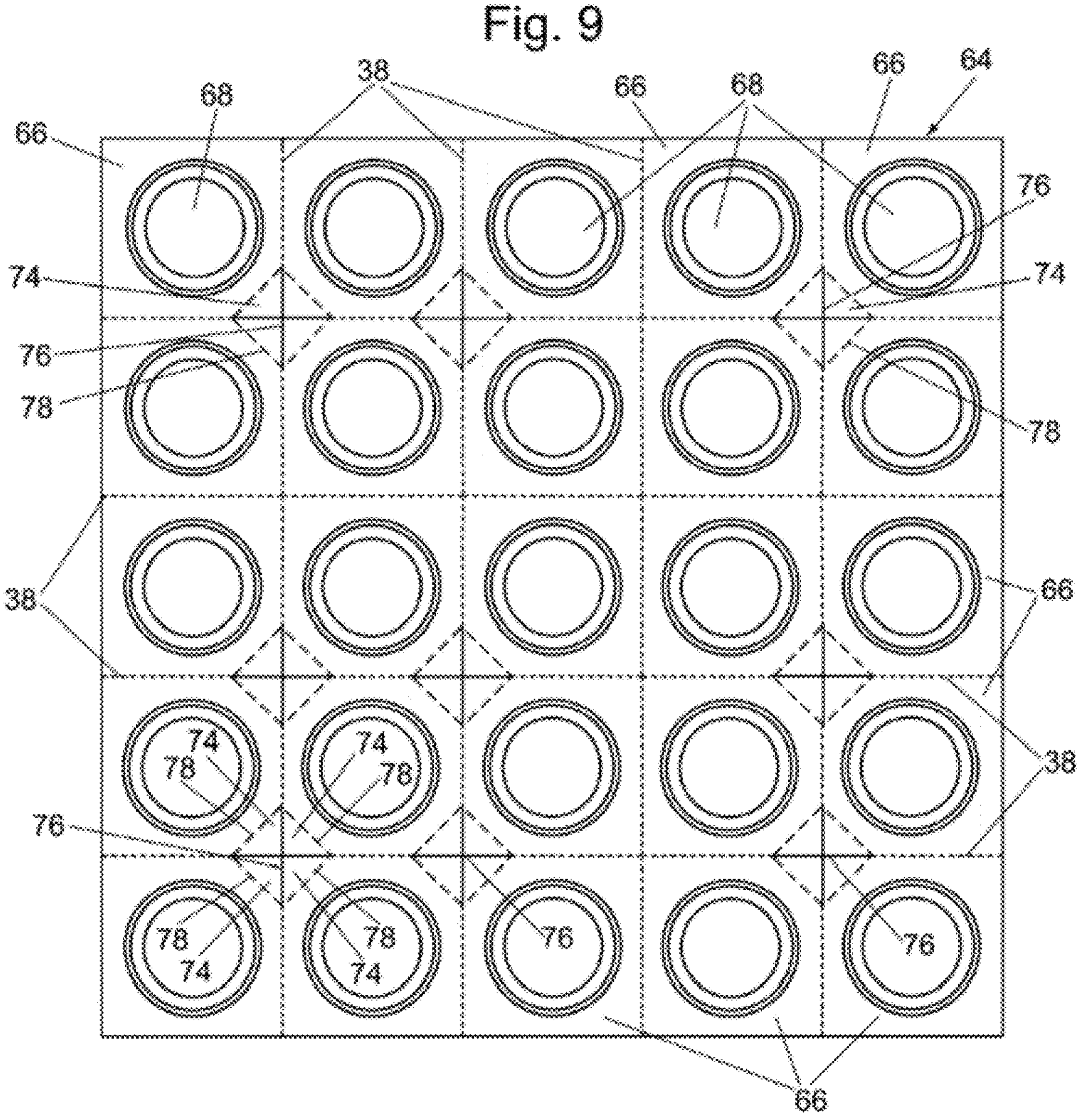
FIG. 9 is a plan view of an alternative base member that the cover sheet of the subject invention can be used with to form a tamper-evident multi-compartment dispensing package.
Figure 10:
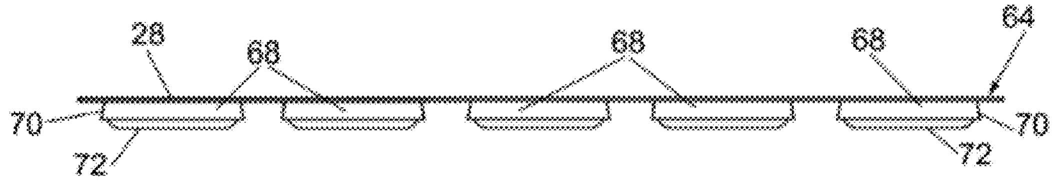
FIG. 10 is a side elevational view taken along line 10-10 of FIG. 9.

FIGS. 9 and 10 show an alternative base member 64 which can make use of a cover sheet constructed in accordance with this invention to form an alternative multi-compartment package to package 20 described above. The base member 64 is similar in many respects to the base member 24 and in some respects is different. The features of base member 64 which are common with the features of the base member 24 will be given the same reference numbers and the details of their construction, configuration and operation will not be reiterated in the interest of brevity.

The base member 64 includes plural blister compartment units 66, each of which is of square profile having a generally planar flange 28 from which a hollow chamber 68 depends downwardly. In this exemplary embodiment each compartment unit is approximately 3 cm by 3 cm square. Each chamber 68 is of circular profile, e.g., of 2.06 cm diameter, and includes a downwardly extending circular sidewall 70 (FIG. 10) which flares outward at a de-nest angle of approximately 3 degrees and which terminates at a generally planar bottom wall 72. The flanges 28 of the compartment units 66 are releasably connected to one another by plural intersecting parallel linear frangible lines 38. The base member is formed of any suitable material, e.g., a plastic, like that of the base member 24.

Unlike the base member 24, the base member 64 does not include the nine openings 52 in the flanges 28 to serve as a location for a user to grasp the corner of the closure member to peel it off of the flange of the compartment holding the item to be accessed. However, the base member 64 does include foldable tabs, at those nine locations, which serve the same function as the openings 52. Those foldable tabs, when folded down, as will be described shortly, enable one to readily gain access to a corner of the closure member to enable that closure member to be peeled off of its compartment unit to provide access to the item within its chamber. Moreover, the foldable tabs at those nine locations also serve as a tamper-evident means.

In accordance with one aspect of this invention at least one corner of the flange 28 of each of compartment unit 66 includes a triangularly shaped foldable tab 74 to enable the user to fold down that corner of the flange 28, whereupon the closure member can be grasped at that corner to remove it, e.g., peel it off the underlying flange. The foldable tabs the corners of the compartment units 66 of the base member 64 are preferably at the same position as the cutaway openings 52 in the base member 24. Thus, some of the compartment units include two foldable tabs.

The foldable tabs are formed by respective cruciform shaped frangible separation lines (e.g., cuts) 76 extending through the planar flanges where the frangible lines 38 intersect in cooperation with four diagonally oriented fold lines 78. Each fold line 78 is contiguous with and connects adjacent ends of the cruciform shaped frangible separation lines 76 at the corners of the flanges 28 where the frangible lines 38 intersect, whereupon the contiguous diagonal fold lines 78 form a diamond shaped area surrounding the cruciform shaped frangible separation lines. Thus, the corner of each of the flanges 28 of those compartment units at the intersection of the frangible lines 38 includes a diagonal fold line 78 which together with the contiguous portions of the cruciform shaped frangible separation lines 76 forms a triangularly shaped, foldable tab 74.

The flanges of the multi-compartment base 64, like the multi-compartment base 24, are detachably connected along the frangible separation lines 38 connecting the corners so that each compartment unit may be separated from the other compartment units.

Once a sealed compartment unit has been separated from the other compartments of the package, the closure member of the separated compartment can be peeled off the flange of that compartment by folding down the foldable tab 74 at a corner thereof from the plane of the flange 28. That action exposes the undersurface of the closure member at that corner to enable it to be readily grasped by a user to lift and peel the closure member off of the flange, in a similar manner to that described with reference to the removal of the closure member from a compartment unit formed from the base member 24.

As should be appreciated by those skilled in the art any attempt to fold one of the foldable corners 74 down from the plane of its flange will result in that foldable corner being displaced from the plane of the flange, which can be readily seen, thereby providing any package made with a base member like base member 64 with an additional tamper-evident feature over that provided by the tamper-evident closure members 40 of the cover sheet 22.

It must be pointed out at this juncture that the embodiments as described above are merely exemplary of various embodiments of this invention which are contemplated. For example, instead of making use of a releasably securable adhesive extending over the entire undersurface of the foil layer 22B and with liner patches 48 located where the chambers 30 or 68 are located, the adhesive 22C on the undersurface of the foil layer 22B may be a patterned adhesive. By that it is meant that the adhesive is applied in a pattern on the undersurface of the foil layer so that it is located only in the areas where the flanges 28 of the base member 24 or 64 are located. Thus, the portions of the undersurface of the foil layer within the bounds of the pattern adhesive forming the flange engaging portions of the cover sheet, i.e., the portions of the undersurface of the foil which will overlie the openings to the chambers will not have any adhesive thereon. Moreover, the size and shape of each of the compartment units and the chambers thereof can be selected as desired for the particular application. Thus, for example the compartment units may be rectangular in shape instead of the square shape shown and described above. The chambers can be of various shapes other than the circular shape as described above. Thus, the chambers can be oval in shape or square with rounded corners or rectangular with rounded corners. With respect to the tamper-evident means of the cover sheet 22 the shape, sizes and locations of the cuts making up such means can be altered from that shown and described above, so long as the cuts are configured and form some kind of tapered edge which may be a sharp point or even arcuate or curved, so that an attempt to peel or lift any portion of a closure member from the underlying compartment unit will result in a visible tear in the closure member starting at the tapered edge and propagating therefrom, thereby evidencing tampering.

Without further elaboration the foregoing will so fully illustrate our invention that others may, by applying current or future knowledge, adopt the same for use under various conditions of service.

We claim:

1. A cover sheet configured for securement to a base member having a plurality of individual compartment units releasably secured to one another and disposed in an array of plural rows and plural columns, each compartment unit comprising a flange and a chamber depending from the flange, the flange extending around the periphery of the chamber, the flanges being detachably connected along frangible separation lines so that each compartment unit may be separated from the other compartment units, said cover sheet comprising:

a top surface and an undersurface and comprising a plurality of closure members disposed in an array of plural rows and plural columns, each of said closure members being releasably secured to one another along frangible separation lines of said closure members, said cover sheet being configured to be releasably secured to the flanges of the base member, whereupon said frangible separation lines of said cover sheet are coincident with the frangible separation lines of the base member and respective ones of said closure members are releasably secured to respective ones of the compartment units to form respective sealed compartment units; and a plurality of tamper-evident cuts extending into said top surface of said cover sheet, each of said tamper-evident cuts being an arc having a portion directed toward a respective portion of said closure member and configured when said cover sheet is secured to the base member to initiate tearing of said closure member upon lifting of said closure member off an associated compartment unit closely adjacent said tamper-evident cut.

2. The cover sheet of claim 1, wherein each of said arcs comprises a rounded corner of a square or rectangle centered in each of said closure members.

3. The cover sheet of claim 2, wherein each of said arcs comprises an arc of a circle.

4. The cover sheet of claim 3, wherein each of said arcs is approximately 90 degrees.

5. The cover sheet of claim 1, wherein said cover sheet includes an undersurface having an adhesive thereon, said adhesive being configured to releasably secure said cover sheet to the base member.

6. The cover sheet of claim 5, wherein said undersurface of each of said closure members includes a non-stick area configured to be disposed over an opening of the chamber.

7. The cover sheet of claim 6, wherein said non-stick area comprises a liner patch configured to be disposed over an opening of the chamber.

8. The cover sheet of claim 1, wherein the individual compartment units of said base member include a cut away or foldable tab corner and wherein said cover sheet includes indicia thereon, said indicia being located at respective portions of said cover sheet corresponding to the location of said cut away or foldable tab corners of the compartment units when said cover sheet is secured thereto.

9. The cover sheet of claim 1, wherein each of said closure members is of square shape.

10. The cover sheet of claim 1, wherein said top surface is formed of paper, and wherein said undersurface is a metal foil.

11. The cover sheet of claim 10, wherein said tamper-evident cuts extend at least partially into said closure members from said top surface towards said undersurface.

12. The cover sheet of claim 10, wherein said tamper evident cuts extend fully through said closure members from said top surface to said undersurface.

* * * * *